April 1, 1924.
F. S. FLOETER
CHUCK OPERATING DEVICE
Filed June 21, 1923    2 Sheets-Sheet 1
1,488,668
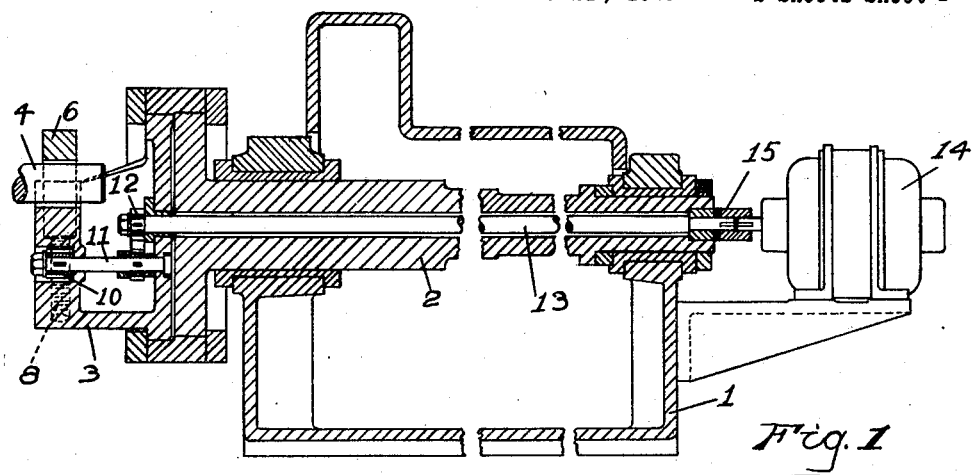
Fig. 1
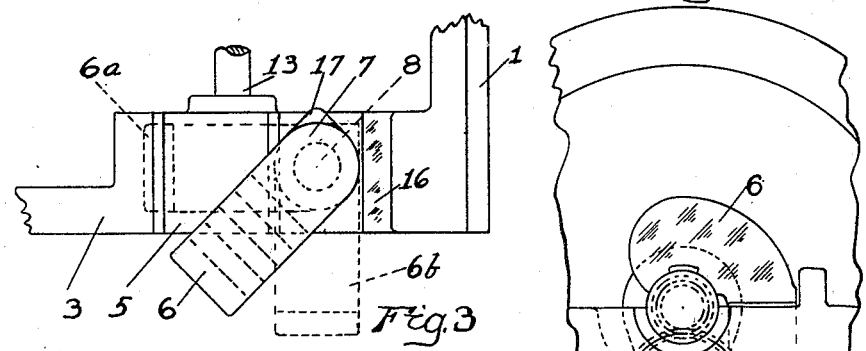
Fig. 3
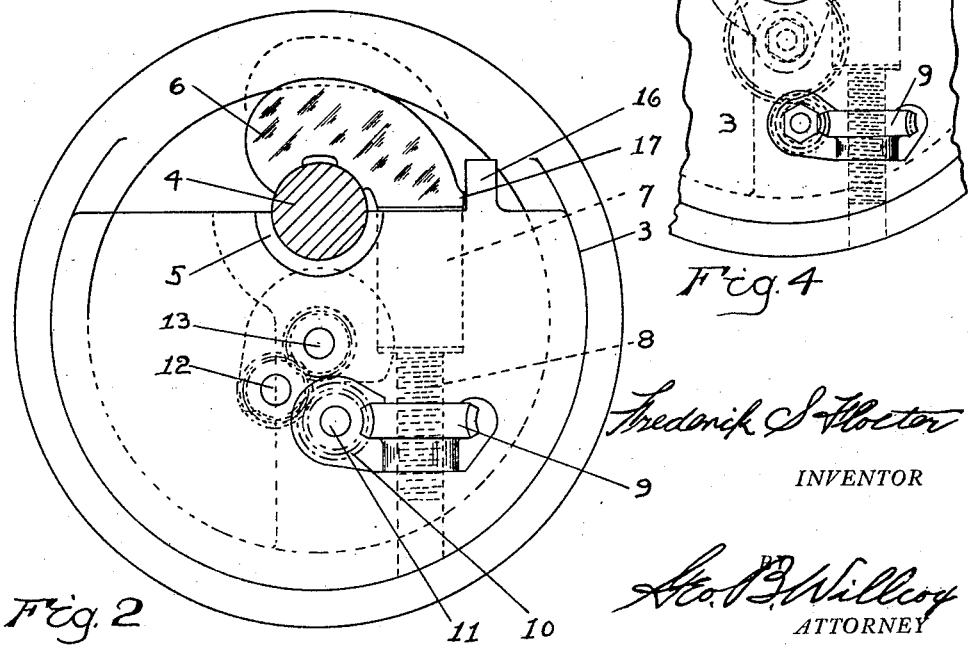
Fig. 4
Fig. 2
Frederick S. Floeter
INVENTOR
Geo. B. Willcox
ATTORNEY

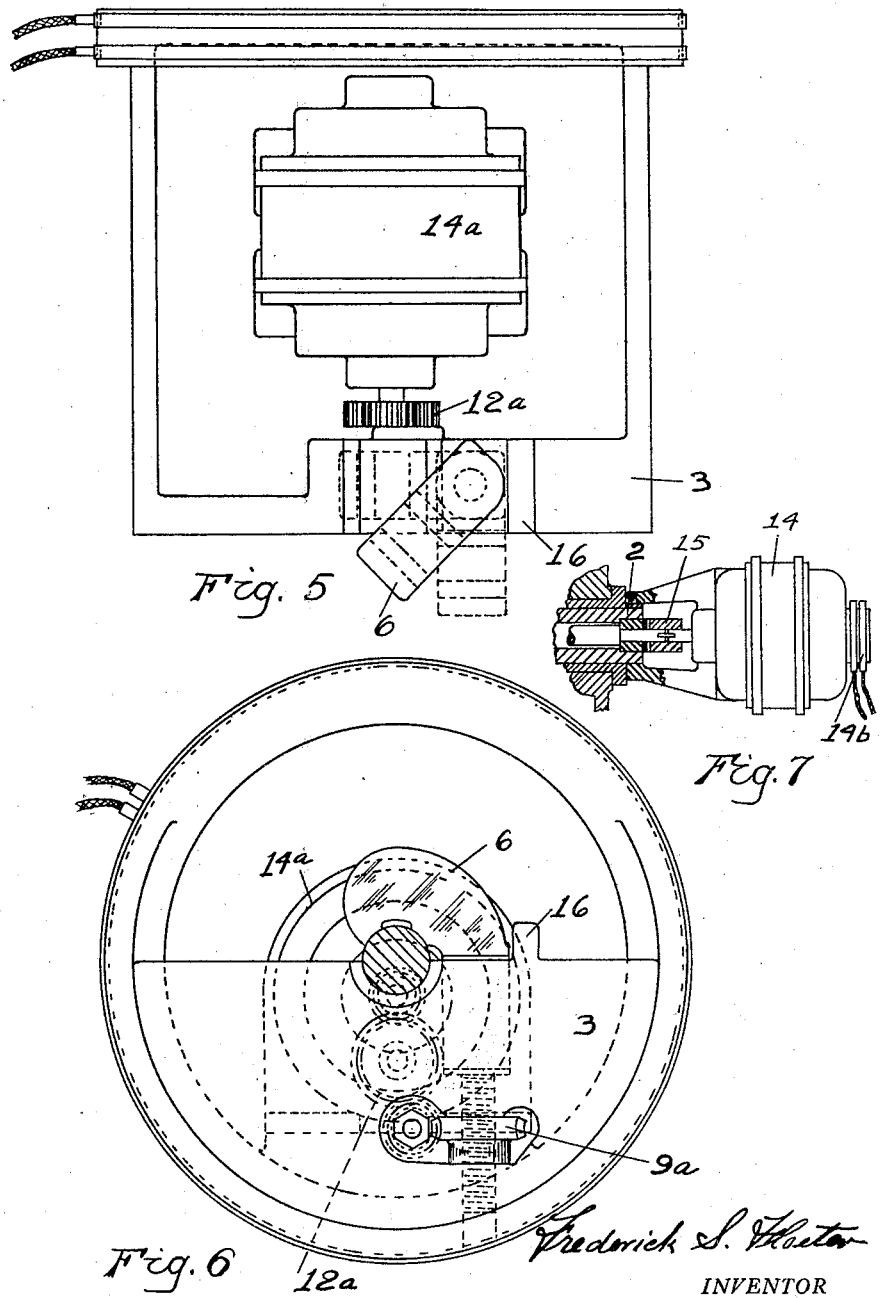

Patented Apr. 1, 1924.

1,488,668

UNITED STATES PATENT OFFICE.

FREDERICK S. FLOETER, OF SAGINAW, MICHIGAN, ASSIGNOR TO WICKES BROTHERS, OF SAGINAW, MICHIGAN, A CORPORATION OF MICHIGAN.

CHUCK-OPERATING DEVICE.

Application filed June 21, 1923. Serial No. 646,819.

*To all whom it may concern:*

Be it known that I, FREDERICK S. FLOETER, a citizen of the United States, residing at Saginaw, in the county of Saginaw and State of Michigan, have invented certain new and useful Improvements in Chuck-Operating Devices; and I do hereby declare the following to be a full, clear, and exact description of the invention, such as will enable others skilled in the art to which it appertains to make and use the same.

This invention pertains to chucks and relates more particularly to a means for chucking automobile crank shafts and the like in lathes for turning or grinding.

It has been found in practice that the total lathe operation time on one gas engine crank shaft pin is approximately two and one half minutes, although the actual cutting time per pin is only sixty seconds. The time consumed by the operations of placing the shaft in the lathe, clamping it and removing it after machining is, therefore, about four times that required for the actual cutting-tool operation.

My present invention provides a chucking mechanism that reduces the time required to clamp and unclamp the work, thereby greatly increasing the hourly output of the machine.

More specifically, the objects of my invention are to provide a motor-operated clamp-actuating device for quickly and easily clamping and releasing the work.

A further object is to produce a power-actuated clamp that normally remains clear of the chuck when not being used, but when operated automatically swings into position above the chuck and descends and rigidly clamps the work. Upon reversal the clamp automatically rises clear of the work and swings out of the way into its initial position.

My invention also provides as an integral part of the work-holding chuck a clamp actuating gearing that derives its power from a motor mounted on the work chuck or from a rotatable shaft concealed within the hollow lathe spindle, the shaft rotated by a motor preferably mounted on the lathe stock.

With the foregoing and certain other objects in view which will appear later in the specifications my invention comprises the devices described and claimed and the equivalents thereof.

In the drawings, Fig. 1 is a vertical section through the head stock of a crank shaft lathe.

Fig. 2 is a front view of the chuck with the work in place.

Fig. 3 is a fragmentary plan view of the parts shown in Fig. 2, the work removed.

Fig. 4 is a front view of the clamping device adapted for clamping straight work coaxial with the lathe spindle.

Fig. 5 is a plan view of a modified form of chuck with a clamp-actuating motor mounted thereon.

Fig. 6 is a front view of the parts shown in Fig. 5.

Fig. 7 is a detailed view of a modified motor mounting.

As is clearly shown in the drawings, Figs. 1 to 3, 1 is a head stock of a lathe carrying the usual hollow work spindle 2. 3 is the work chuck and 4 is the shaft or other work on which a crank pin is to be machined.

The face of the chuck is provided with a work seat 5, above which is a vertically movable clamping head 6 which is also capable of swinging sideways into the positions shown by dotted lines at 6ª and 6ᵇ in Fig. 2.

The head 6 has a longitudinally movable and rotatable shank 7 carried by a suitable bearing on the chuck 3. Integral with the shank 7 is a screw 8 threaded through the hub of a worm gear 9 which is rotatable, but immovable axially, being mounted as shown in Fig. 3 in the face of work chuck 3.

10 is a worm fixed to worm shaft 11, and 12 is a train of gears actuating the worm shaft and may be driven by a rotatable shaft 13 within the hollow spindle 2 of the lathe. An electric or other motor 14 has its shaft connected by a suitable coupling 15, to shaft 13.

To limit the sidewise movement of clamping head 6 I provide on chuck 3 as shown in Fig. 2, a lug 16 to stop the head 6 in the position indicated at 6ᵇ. On the head 6 I also provide a shoulder 17 to engage the lug 16 when the head is in position 6ª.

The operation of chucking a crank shaft for turning or grinding is as follows:

The work-clamping head 6 being out of the way in position 6^b, the shaft end 4 is placed on the seat 5 of chuck 3 and the motor 14 is started.

Shaft 13 turns the train of gears 12, the shaft 11, worm 10 and the worm wheel 9 which latter acts as a revolvable but longitudinally immovable nut.

At first screw 8 turns with nut 9 and swings the clamp head 6 from its idle position 6^b into position 6^a above the work seat 5. Further turning of head 6 is checked by stopping of shoulder 17 against lug 16. Thereafter the threaded worm wheel 9 draws screw 8 downward until clamp head 6 grips the work tight upon seat 5. The shank or spindle 7 is closely but slidingly fitted to its bearing in chuck 3 and prevents lateral strain being brought upon screw 8 when the clamp is in action.

The reduction gears 12, worm gear 9 and screw 8 form a powerful self-locking train.

Motor 14, although it may have but small power, is capable of drawing the head 6 down upon the work with great force. When the motor is stopped the self-locking train of gearing will prevent the clamp 6 from loosening its grip. If clamping is completed before the motor current is shut off shaft 13 and the rotor of the motor will stop but the field of the motor may remain excited for a short time without danger of injuring the motor so that the operator need not shut off the motor upon the instant. Reversing the direction of the motor reverses the steps of the clamping operation. In such case the worm gear lifts the clamp head 6 until it clears the work 4, whereupon it automatically swings into position 6^b of Fig. 3 and comes to rest against stop 16. The motor may then be shut off by the operator.

The type of chuck clamping mechanism and the power drive for actuating the clamp as previously described is particularly adapted for turning crank pins on crank shafts for reciprocating engines and the like where the work 4 is offset radially from the spindle axis by a distance equal to the length of the crank.

For turning or grinding straight shafts the work is chucked coaxial with the lathe, as shown in Fig. 4, the train of gearing between the shaft 13 and worm gear 9 being modified as to its position and arrangement to suit the space available in the chuck and the location of the work clamp head 6.

In the foregoing description the motor has been located at the remote end of the head stock and drives the chuck gears by shaft 13.

In the modified form shown in Fig. 5 the motor 14^a is mounted in the chuck 3 and revolves with it. The train of gears 12^a is connected direct to the motor and drives the internally threaded worm gear 9^a in the same manner that gear 9 is driven in the arrangement shown in Fig. 2.

The motor 14^a may also be used for actuating a clamp similar to that of Fig. 2 and adapted for chucking crank shafts in a crank pin turning lathe.

It is sometimes desirable to support the motor upon the revolving work spindle 2, as shown in Fig. 7, in which case the motor body revolves with the spindle, and current is supplied to the slowly revolving motor by means of commutator rings and brushes 14^b, as shown.

While I have shown and described an electric motor as the source of power for actuating the clamp 6, it is obvious that any other type of motor driven by steam, air or liquid may be employed if desired. Also I have shown a rigid coupling 15 connecting the shaft of motor 14 with rotatable spindle 13, but any other suitable form of coupling, as a friction coupling, may be employed if desired, without departing from my invention as set forth in the claims.

Having thus described my invention, what I claim and desire to secure by Letters Patent is:

1. In a lathe having a hollow spindle, a chuck formed with a work seat and a clamping head movable toward and from the said seat and angularly movable with respect thereto, a threaded shank on said head, a revolvable axially immovable nut threaded on said shank, a revolvable shaft in said hollow spindle, and gearing operatively connecting said shaft and revolvable nut.

2. In a lathe having a hollow spindle, a chuck formed with a part-cylindric work-receiving seat, a clamping head movable toward and from the said seat and angularly movable with respect thereto, a shank on said head, said shank longitudinally slidable in said chuck, a rotatable motor-driven shaft extending through said spindle, and gearing operatively connecting said rotatable shaft and said slidable shank.

3. In a lathe having a stock and a hollow spindle, a chuck on said spindle having a work seat, a clamping head movable toward and from the said seat and angularly movable with respect thereto, a threaded shank on said head, a worm wheel threaded on said shank, a worm meshing with said worm wheel, a motor on said lathe stock, a revolvable shaft in said hollow spindle driven by said motor and reducing gears carried by said chuck and operatively connecting said shaft and worm.

4. In a lathe, a revolvable work chuck formed with a work-receiving seat, a clamping head on said chuck movable toward and from said seat and angularly movable with respect thereto, a shank on said head, said shank longitudinally slidable in said chuck, a revolvable, axially immovable nut operatively engaging said shank, a motor, and gearing operatively connecting said motor and said revolvable nut.

5. In a lathe, a revolvable work chuck formed with a work-receiving seat, a clamping head on said chuck movable toward and from said seat, a shank on said head, said shank longitudinally slidable in said chuck, a revolvable, axially immovable nut operatively engaging said shank, a rotatable spindle in said chuck, gearing connecting said nut and rotatable spindle and adapted to transmit the movement of rotation of said spindle into longitudinal movement of said clamping head.

In testimony whereof, I affix my signature.

FREDERICK S. FLOETER.